June 13, 1950          C. E. DENNIS          2,510,962

RADIO-FREQUENCY TESTING CIRCUIT

Original Filed March 1, 1946

Inventor
CHARLES E. DENNIS

By
Attorney

Patented June 13, 1950

2,510,962

UNITED STATES PATENT OFFICE 2,510,962

RADIO-FREQUENCY TESTING CIRCUIT

Charles E. Dennis, United States Navy

Original application March 1, 1946, Serial No. 651,415. Divided and this application June 3, 1949, Serial No. 97,871

11 Claims. (Cl. 315—368)

(Granted under the act of March 3, 1883, as amended April 30, 1928; 370 O. G. 757)

This invention relates to a radio-frequency testing circuit, and more particularly to that type of testing circuit that indicates the deviation of frequency-sensitive electrical elements from a predetermined standard.

This application is a division of application Serial No. 651,415, filed March 1, 1946, now Patent No. 2,472,096, for Radio-frequency testing circuit.

An object of this invention is to provide a radio-frequency testing circuit which will rapidly produce accurate indication of the magnitude that the interelectrode capacitances of vacuum tubes differ from those of a prescribed standard tube.

Another object of this invention is to provide a radio-frequency testing circuit that utilizes three oscillating voltages, each 120° out of phase with the other but of equal voltage amplitude and of the same selected frequency.

Another object of this invention is to provide a radio-frequency testing circuit that will require personnel engaged in operating the device to make only an initial adjustment in order to make a desired series of tests.

A further object of this invention is to provide a testing device of the variety described of simple design in which the circuit elements are limited to condensers, resistors, and electronic tubes, and in which no inductances are required.

Other objects and improvements over prior art will be apparent from the following description.

Reference is now made to the accompanying drawings in which.

The invention comprises three vacuum tubes connected as cathode followers, each of which are fed a single phase of the three required oscillating voltages of 120° phase difference. The source of the oscillating voltages may be a common source providing the three required outputs, or may be individual sources providing the desired oscillating voltages. Each of two of these cathode follower tubes cathode couples the voltage impressed on its grid to two tubes connected as amplifiers respectively, while the third cathode follower tube, which is the tube to be tested, cathode couples the voltage impressed on its grid to both of the amplifier tubes. It is here pointed out that the oscillating voltages fed to the first two cathode follower tubes may have any phase relationship provided their amplitudes are equal and provided the phase angle of the third oscillating voltage bisects the phase angle formed by the first two oscillating voltages. It is also not necessary that the third oscillating voltage be equal in amplitude to the first two oscillating voltages. The forthcoming analysis will apply only to the specific case wherein the three oscillating voltages are of equal amplitude and phase; however, an analysis applicable to any three oscillating voltages meeting the requirements stated above will parallel this forthcoming analysis. The deviation of the tube under test from a predetermined standard produces a phase shift in the common voltage that is cathode coupled to both amplifier tubes. This phase shift will cause unequal currents to flow in the amplifier tubes causing a deflection of a direct-current indicator connected for differential action between the plates of the two amplifier tubes. Proper adjustment of a shunting potentiometer across this direct-current indicator to provide the proper sensitivity will produce deflections to indicate percentage deviation from standard as read from a previously calibrated scale of the indicator.

Figure 1:
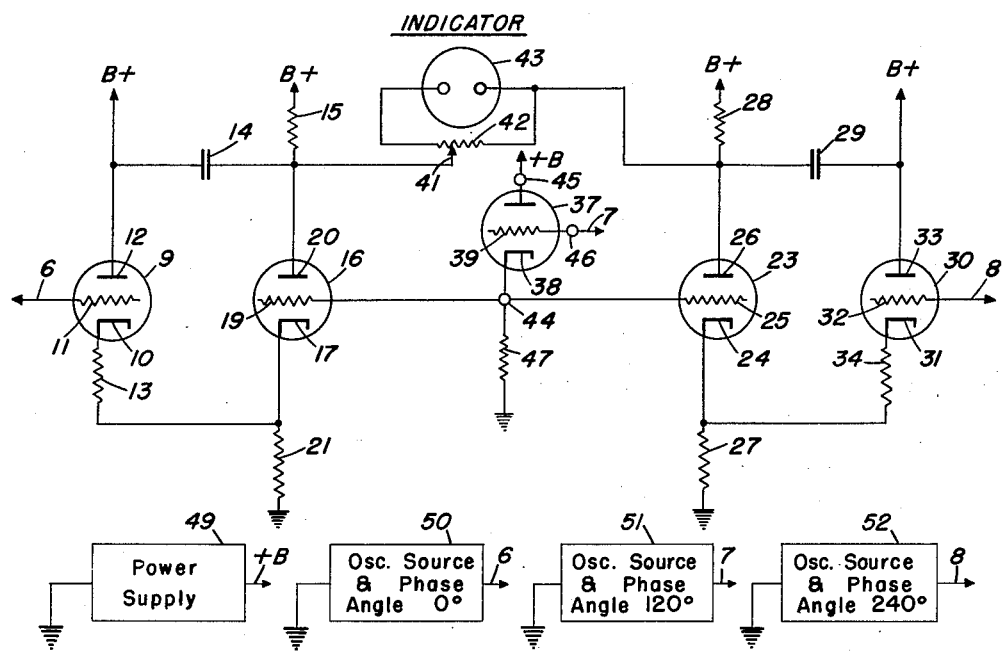
Fig. 1 is a circuit diagram of the radio-frequency testing device.

In the embodiment of Fig. 1, it is shown that the radio-frequency testing device consists generally of the vacuum tubes 9, 16, 23, 30 and 37 in addition to the associated circuits. The five vacuum tubes shown herein in the form of triodes may have any number of elements; and it is to be understood that this invention is not to be limited to tubes of the triode classification. The grid 11 of the tube 9 is connected to the zero-phase voltage 6 of the oscillating source 50. The plate 12 is connected directly to the positive terminal of a high voltage, direct-current plate voltage supply 49. The load resistance for the tube 9 is the series combination of resistors 13 and 21 connected between the cathode 10 and ground, the junction between the two resistors being connected to the cathode 17 of the tube 16. The plate 20 of tube 16 is connected to the power supply 49 through the load resistor 15. A condenser 14 connecting the two plates 12 and 20 provides a radio-frequency path to ground for the plate 20. In a like manner, the grid 32 of the tube 30 is connected to the 240° phase voltage 8 of the oscillating source 52. The plate 33 is connected directly to the positive terminal of the power supply 49. The load resistance for the tube 30 comprises the series combination of resistors 27 and 34 connected between the cathode 31 and ground, the junction between the two resistors being connected to the cathode 24 of the tube 23. The plate 26 of tube 23 is connected to the positive terminal of the power supply 49 through the resistor 28, the plate 26 being also connected to the plate 33 by means of a condenser 29 acting as a radio-frequency by-pass to ground. The grid 39 of tube 37 is connected to the 120° phase voltage 7 of the oscillating source 51 through test terminal 46, the plate 40 being directly connected to the positive terminal of the power supply 49 through test terminal 45. A test terminal 44 is provided at the cathode 38, there being a non-reactive impedance 47 inserted between terminal 44 and ground. It is thus seen that terminal 44 and impedance 47 provide a return circuit for the cathode 38 of tube 37 under test through power supply 49. The tube 37 to be tested is connected to test terminals 44, 45, 46, as shown in Fig. 1, there being a direct connection of grids 19 and 25 with the cathode 38. The plate 20 is connected to an arm 41 of the potentiometer 42 which is connected across the terminals of a direct-current indicator 43, whereas the plate 26 is connected directly to one terminal of the indicator 43, thereby connecting said indicator 43 for differential action, that is responsive to the difference in plate currents between tubes 16 and 23.

In operation, the cathode circuits of the tubes 9 and 30 provide cathode coupling of the voltages 6 and 8 to the tubes 16 and 23 respectively. The phase relationship of the voltage on the cathode 38 of the tube 37 to the voltage on the grid 39 will depend on the interelectrode capacitance of tube 37 under test which will result in a phase shift of the frequency of the oscillating voltage 7 on grid 39. The voltage on the cathode 38 is cathode coupled to the grids 19 and 25. The tubes 16 and 23 then vectorially subtract the oscillating voltages 6 and 8 from the voltage on the cathode 38. The resulting grid-to-cathode voltages on the tubes 16 and 23 control the plate current of these tubes, thereby varying the direct-current voltage at the plates 20 and 26. This difference in voltage on the plates 20 and 26 causes the direct-current indicator 43 to deflect, indicating the characteristics of the tube under test.

Figure 2:
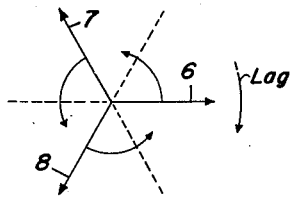
Fig. 2 is a vector diagram representing the input voltages required.

More specifically, the oscillating voltage 6 shown as a vector 6 in Fig. 2 maintains this phase relationship as it appears on the cathode 17. This voltage appearing on the cathode 17 is represented by a vector 6' in Fig. 3 and Fig. 4. Similarly, the oscillating voltage 8 shown as a vector 8 in Fig. 2 maintains its phase relationship as it appears on the cathode 24 and is represented by a vector 8' in Fig. 3 and Fig. 4. The voltages thus impressed on the cathodes 17 and 24 cause a direct current to flow through the tubes 16 and 23 and through their respective load resistors 15 and 28, the oscillating components of this direct current being filtered out by the radio-frequency by-pass condensers 14 and 29 to ground. The magnitude of these direct currents will be dependent upon the characteristics of the particular vacuum tubes employed. In the absence of other signals applied to the tubes 16 and 23, the plate currents in both tubes will be equal, thereby causing equal voltage drops across their respective load resistors 15 and 28. The voltages on the plates 20 and 26 will therefore be equal and no current will flow between them, causing the indicator 43 to remain at its mid-zero position.

If the voltage across impedance 47 were not phase displaced from voltage 7 supplied to grid 39 of tube 37, it is apparent that this voltage on cathode 38 of tube 37 would be displaced 120° from each of voltages 6' and 8' on cathodes 17 and 24, respectively. This voltage on the cathode 38 is represented by a vector 51 in Fig. 4. The effective grid 19 to cathode 17 voltage of the tube 16 will be the vector difference between the voltage on the grid 19 and the voltage on the cathode 17; as according to Fig. 3, the vector difference between vector 51 and vector 6' respectively. This vector difference is equivalent to the vector summation of the vector 51 and vector 52 which is equal in amplitude but opposite in direction to the vector 6'. The resulting grid 19 to cathode 17 voltage is now represented by a vector 54.

Figure 3:
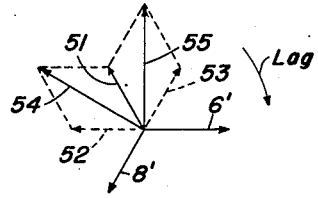
Fig. 3 is a vector diagram showing voltage amplitude and phase relationships of various voltages present in the invention during a described condition of operation.

Similarly, the effective grid 25 to cathode 24 voltage of the tube 23 will be the vector difference between the voltage on the grid 25 and the voltage on the cathode 24; as according to Fig. 3, the vector difference between vector 51 and vector 8' respectively. This vector difference is equivalent to the vector summation of the vector 51 and a vector 53 which is equal in amplitude but opposite in direction to the vector 8'. The resulting grid 25 to cathode 24 voltage is now represented by the vector 55. Thus it can be seen that when there is no phase displacement in the circuit of tube 37, the vector 51 remains 120° from both vectors 6' and 8', and the vectors 54 and 55 will be equal. This condition will cause equal direct currents to flow in the tubes 16 and 23, equal drops across their respective load resistors 15 and 28, and hence, equal voltages to be present on the plates 20 and 26. The equal voltages on the plates 20 and 26 will cause no deflection of the indicator 43 connected between the two plates 20 and 26, and the indicator needle will remain at its mid-zero position indicating standardization.

Figure 4:
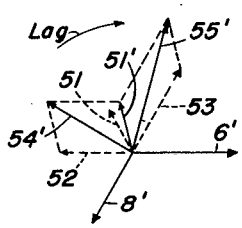
Fig. 4 is another vector diagram of voltages present in the invention during another described condition of operation.

When the tubes under test are substituted for the standardizing tube, any deviations of the interelectrode capacitance will result in a phase displacement of vector 51 from vector 7. This displacement may be either lagging or leading, and the lagging condition will be considered first. This shift is represented in Fig. 4 by the vector 51' rotated from vector 51 of Fig. 3 in a clockwise direction, indicating a voltage lag. The effective grid-to-cathode voltages of the tubes 16 and 23 will now be the vector summations of the vector 52 with the shifted vector 51' and of the vector 53 with the shifted vector 51' respectively. The resulting vectors 54' and 55' thus produced can be seen to be unequal in amplitude thus causing unequal currents to flow in the tubes 16 and 23 and their respective load resistors 15 and 28. Resulting from this condition, unequal voltages will appear on the plates 20 and 26, whereby the indicator 43 will be caused to deflect in one direction from its mid-zero position. When the tube under test results in a voltage leading in phase with respect to voltage 7, the vector 51' will lead the non-reactive vector 51 of Fig. 3, a similar inequality of plate voltages on the tubes 16 and 23 exists, and the indicator 43 will again be caused to deflect but in the opposite direction from its mid-zero position.

For calibration of the indicator, the standardizing tube is again placed in the circuit. The frequency of the oscillating sources 50, 51 and 52 is shifted a known percentage, and the potentiometer 42 is adjusted thereby altering the sensitivity of the indicator 43 until the indicator 43 reads the same percentage on the calibrated scale. For greater accuracy in calibration, the frequency of the oscillating sources 50, 51 and 52 may be shifted the same percentage in the opposite direction, actuating the indicator 43 in the opposite direction. If necessary, readjustment can then be made with the potentiometer 42 to obtain a deflection corresponding to the known percentage frequency deviation. The oscillating source is then readjusted to the original frequency whereupon the meter should read at its mid-zero position. A tube to be tested can now be substituted for the standardizing tube, and the amount and direction of the deviation can now be read directly from the calibrated scale, thereby presenting an indication of the relative magnitudes of the interelectrode capacitances of the standard tube and the tubes under test.

The invention described herein may be manufactured and used by or for the Government of the United States of America for governmental purposes without the payment of any royalties thereon or therefor.

What is claimed is:

1. In a radio-frequency testing circuit, comprising: a first amplifying tube having a cathode a control grid and a plate; a first vacuum tube having a grid and cathode, said cathode being cathode coupled to the cathode of said first amplifying tube; a second amplifying tube having a cathode, a control grid and a plate, a second vacuum tube having a grid and a cathode, said cathode being cathode coupled to the cathode of said second amplifying tube; testing terminal means for connecting the elements of a vacuum tube in a circuit, having a plate, a grid, and cathode terminal including a cathode terminal return; a direct-current indicator connected for differential action between the plates of said first and second amplifying tubes; radio-frequency bypass means for eliminating the radio-frequency present at the plates of the amplifying tubes; non-reactive impedance means series connected in the cathode terminal return of said testing terminal means; a source of three alternating voltages all of the same frequency, two having the same amplitude, said three voltages having a phase relationship such that a given phase angle between said two equal amplitude voltages is bisected by the phase of the third voltage, said two equal amplitude voltages being fed to the grids of said first and second vacuum tubes respectively and said third voltage being fed to the grid terminal of said testing terminal means; and a direct-current voltage source for the energization of all of said tubes and said testing terminal means.

2. The apparatus as set forth in claim 1 in which the source of the three alternating voltages provides voltages all of the same frequency and the same amplitude, said three voltages having a phase relationship such that a given phase angle between two of said voltages is bisected by the phase of the third voltage, said two voltages being fed to the grids of said first and second vacuum tubes respectively, and said third voltage being fed to the grid terminal of said testing terminal means.

3. The apparatus as set forth in claim 1 in which the source of the three alternating voltages provides voltages all of the same frequency, two having the same amplitude, said three voltages being 120° phase-related, said two voltages being fed to the grids of said first and second vacuum tubes respectively, and said third voltage being fed to the grid terminal of said testing terminal means.

4. The apparatus as set forth in claim 1 in which the source of the three alternating voltages provides voltages all of the frequency and the same amplitude, said three voltages being 120° phase-related, and being fed to the grids of said vacuum tubes and grid terminal of said testing terminal means, respectively.

5. The apparatus as set forth in claim 1 and sensitivity adjusting means for the direct-current indicator.

6. In a testing circuit: a pair of vacuum tubes each including a cathode, a grid; a plate load circuit, and a direct-current indicator connected for differential action between said plate circuits; a pair of amplifying tubes each having a plate, a cathode, and a grid; resistance means coupling the cathodes of said amplifying tubes to the cathodes of said vacuum tubes, respectively; a plurality of test terminals adapted to operatively connect a vacuum tube to be tested, one terminal for each of the plate, grid, and cathode of the tube to be tested; means connecting the cathode test terminal to the grids of said vacuum tubes; a non-reactive impedance series connected between the cathode and plate test terminals; a source of three alternating voltages of the same frequency, at least two having the same amplitude, the third voltage having a phase angle which bisects the phase angle formed between said two voltages; means for feeding said two voltages to the grids of said amplifying tubes, respectively; and means for feeding said third voltage to the grid test terminal.

7. In a testing circuit, the combination comprising: a pair of vacuum tubes each having a cathode, a grid, and a plate load circuit; a direct-current indicator connected for differential action between said plate circuits; a plurality of test terminals adapted to operatively connect a vacuum tube to be tested therebetween, one terminal for each of the plate, grid and cathode of the tube to be tested; means interconnecting the cathode test terminal with the grids of said pair of tubes; a non-reactive impedance series connected between the cathode and plate test terminals; a source of three alternating voltages of the same frequency and at least two having the same amplitude, the phase angle of the third voltage bisecting the angle formed between said two voltages; means for applying said third voltage to the grid test terminal; and means for applying said two voltages to the cathodes of said pair of tubes, respectively.

8. In a testing circuit, the combination comprising: a pair of vacuum tubes each having a cathode, a grid and a plate load circuit; a direct-current indicator connected between said plate circuits; a plurality of test terminals one for each of the plate, grid, and cathode of a tube to be tested, the cathode terminal being connected to the grids of said pair of tubes; a non-reactive impedance serially connected between the cathode and plate terminals; a source of three alternating voltages of the same frequency and at least two having the same amplitude, the phase angle of the third voltage bisecting the angle formed between said two voltages; means for applying said third voltage to the grid test terminal;

and means for applying said two voltages to the cathodes of said pair of tubes, respectively.

9. The combination according to claim 8, wherein said three alternating voltages are 120° phase related.

10. In a testing circuit, the combination comprising: a pair of vacuum tubes each having an input circuit and an output circuit; a direct-current indicator connected between the output circuits; a plurality of test terminals adapted to be connected to the input and output circuits of a tube to be tested; a non-reactive impedance series connected between the output test terminals; means for applying the potential across said impedance to the input circuits of each of said pair of tubes; a source of three alternating voltages of the same frequency and at least two having the same amplitude, the phase angle of the third voltage bisecting the angle formed between said two voltages; means for applying said third voltage to the input circuit test terminals; and means for applying said two voltages to the input circuits of said pair of tubes, respectively.

11. In a testing circuit, a pair of vacuum tubes each having a cathode, a grid and a plate load circuit, a direct-current indicator connected between said plate circuits, a source of three alternating voltages of the same frequency and at least two having the same amplitude, each voltage being phase displaced 120° from the others, means for applying said two voltages to the cathodes of said pair of tubes, respectively, and means for applying said third voltage to each grid of said pair of tubes, said last-named means including a non-reactive impedance and a plurality of terminals connected in series therewith, said terminals being adapted to be connected to the elements of a tube to be tested.

CHARLES E. DENNIS.

No references cited.